(12) United States Patent
Carnevali

(10) Patent No.: US 8,544,161 B2
(45) Date of Patent: Oct. 1, 2013

(54) METHOD FOR MOUNTING A PORTABLE DEVICE

(76) Inventor: Jeffrey D. Carnevali, Seattle, WA (US)

( * ) Notice: Subject to any disclaimer, the term of this patent is extended or adjusted under 35 U.S.C. 154(b) by 112 days.

(21) Appl. No.: 13/161,148

(22) Filed: Jun. 15, 2011

(65) Prior Publication Data

US 2012/0317776 A1     Dec. 20, 2012

(51) Int. Cl.
*A47G 29/08* (2006.01)

(52) U.S. Cl.
USPC .................. 29/450; 248/346.04; 379/455

(58) Field of Classification Search
USPC .................. 29/450; 248/122.1, 172, 346.06, 248/346.07, 316.1; 379/455
See application file for complete search history.

(56) References Cited

U.S. PATENT DOCUMENTS

| | | | | |
|---|---|---|---|---|
| 4,541,597 A * | 9/1985 | Davanture | | 248/167 |
| 5,615,258 A * | 3/1997 | Ho | | 379/446 |
| 5,694,468 A * | 12/1997 | Hsu | | 379/446 |
| 5,903,645 A * | 5/1999 | Tsay | | 379/455 |
| 6,944,294 B2 * | 9/2005 | Tsay | | 379/446 |
| 6,966,533 B1 * | 11/2005 | Kalis et al. | | 248/316.4 |
| 7,080,812 B2 * | 7/2006 | Wadsworth et al. | | 248/316.6 |
| 7,647,676 B2 * | 1/2010 | Carnevali | | 24/523 |
| 8,176,603 B2 * | 5/2012 | Carnevali | | 24/523 |
| 2006/0261227 A1 * | 11/2006 | Petrick et al. | | 248/276.1 |
| 2008/0203260 A1 * | 8/2008 | Carnevali | | 248/316.5 |
| 2010/0237210 A1 * | 9/2010 | Anderson et al. | | 248/274.1 |

\* cited by examiner

*Primary Examiner* — David Bryant
*Assistant Examiner* — Justin Sikorski
(74) *Attorney, Agent, or Firm* — Charles J. Rupnick

(57) ABSTRACT

A method of mounting a hand-held portable telephone or other normally hand-held portable device, wherein the method includes: mounting a body of a portable device holder on a mounting surface external of the portable device holder with a base surface thereof facing substantially away from the mounting surface; rotating opposing arms apart around a central post interior of the body, whereby substantially upright opposing fingers adjacent to ends of the arms are rotated apart; inserting a portable device between the rotated apart opposing fingers; and resiliently urging together the rotated apart opposing arms, whereby opposing fingers are urged into compressive contact with the portable device.

18 Claims, 6 Drawing Sheets

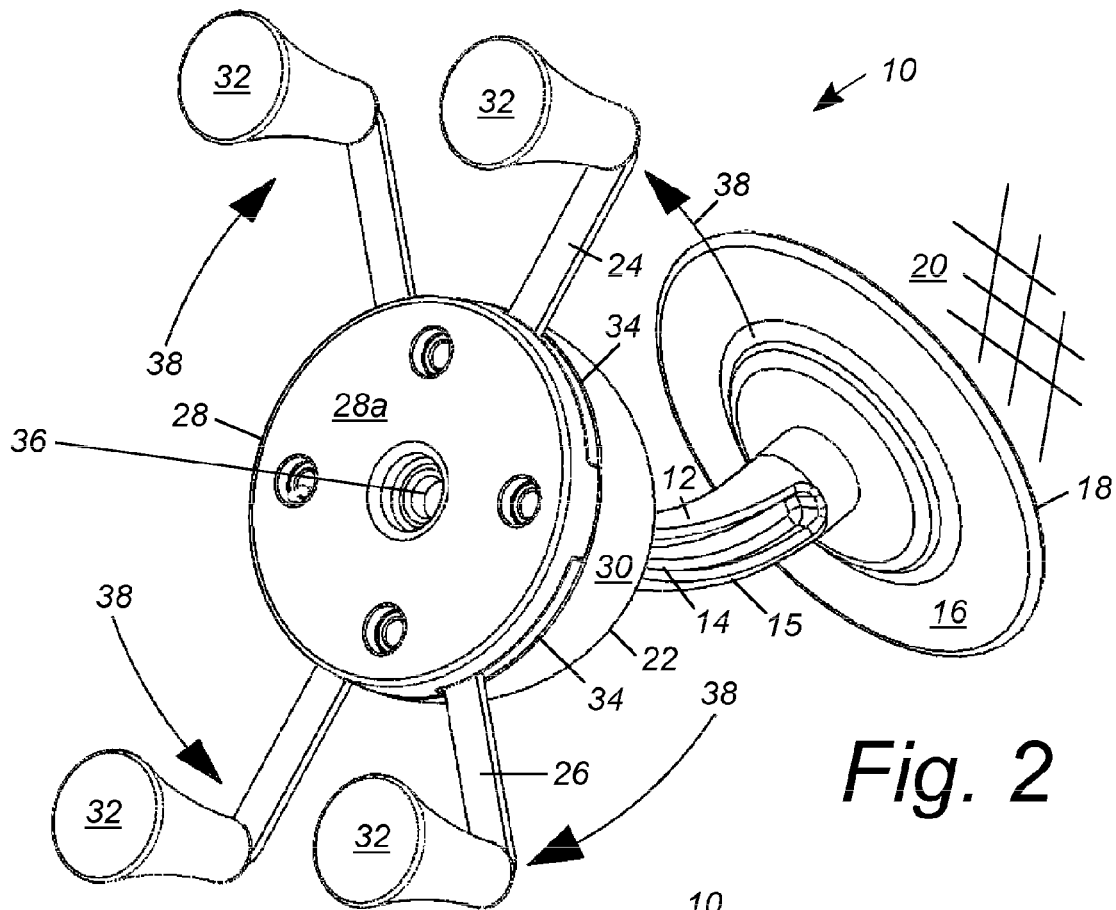
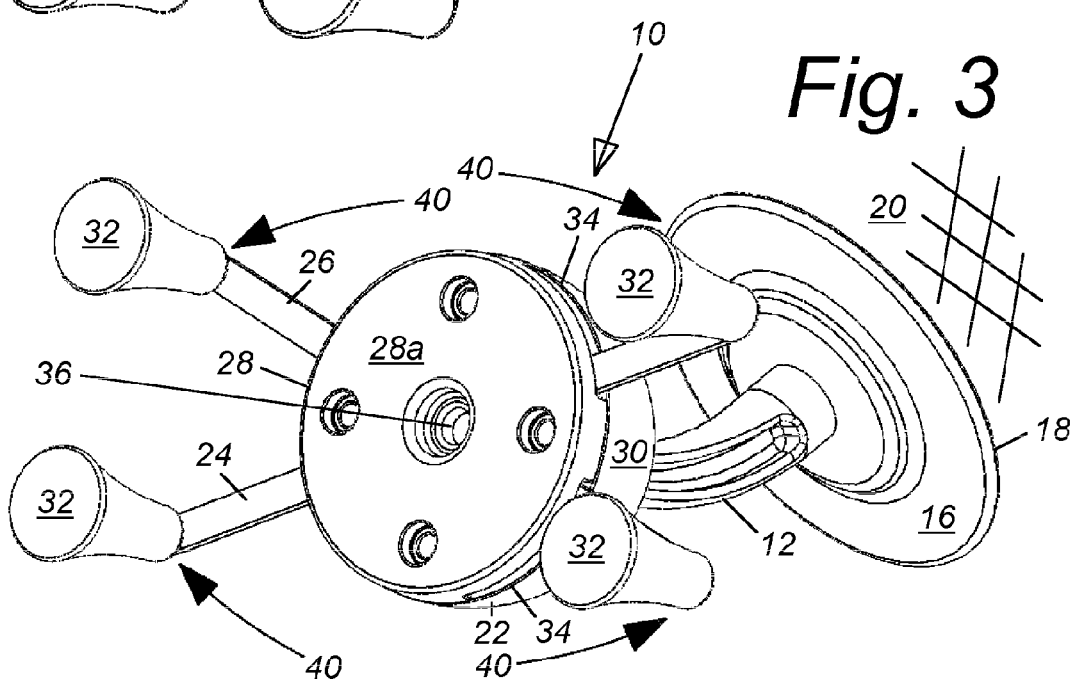

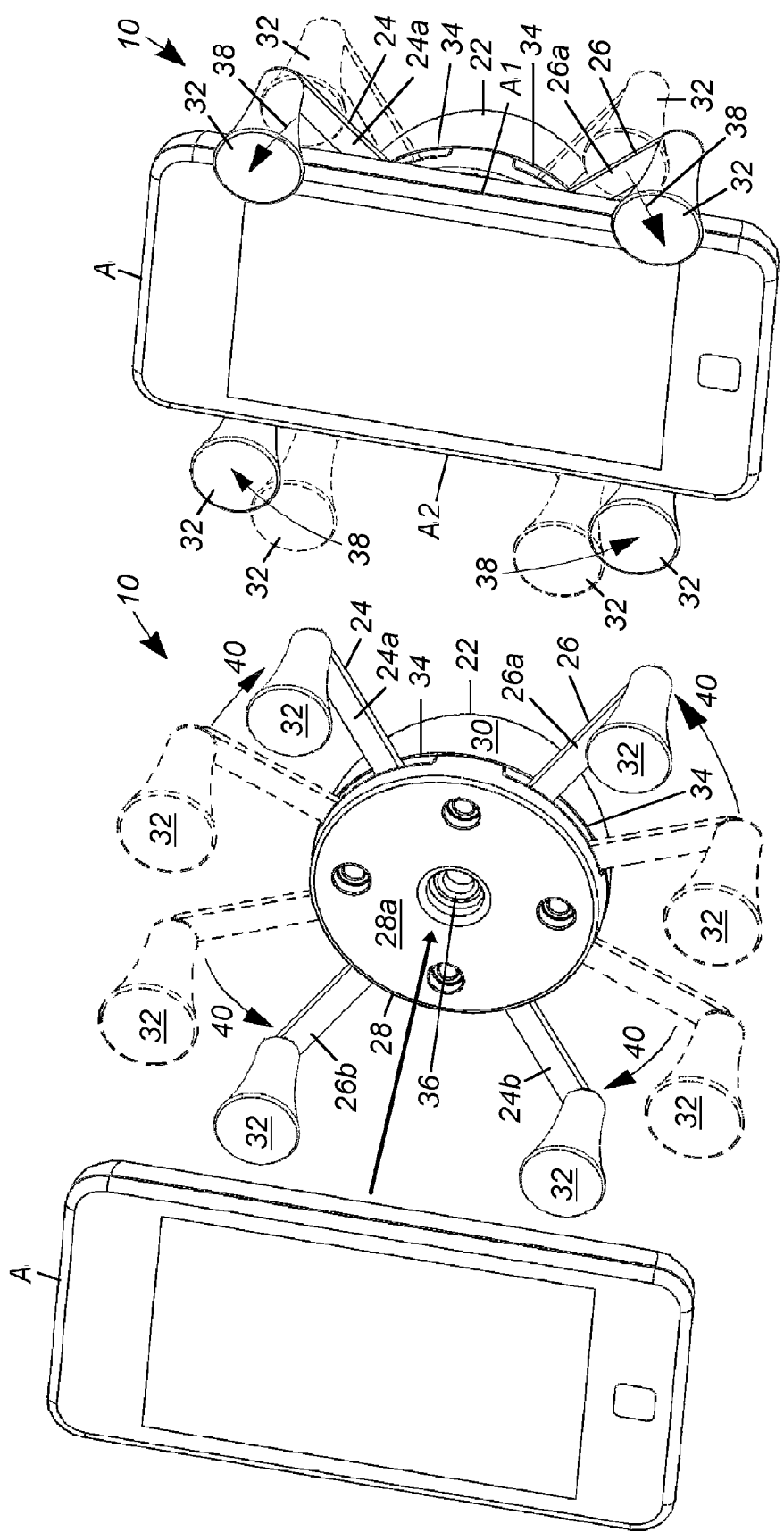

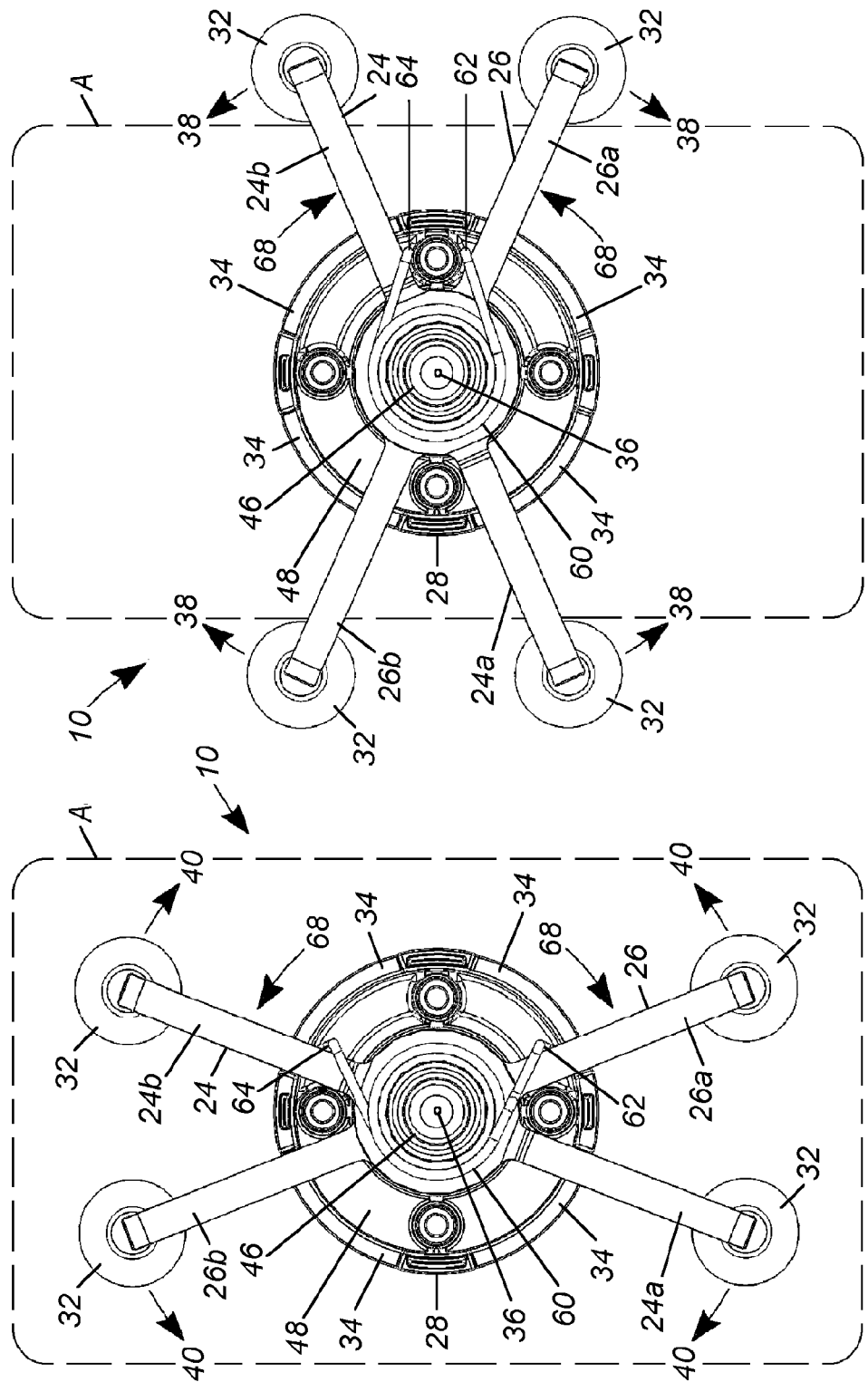

METHOD FOR MOUNTING A PORTABLE DEVICE

FIELD OF THE INVENTION

The present invention relates generally to clamping methods for mounting portable devices, and in particular to spring-driven quick release clamping methods for portable phones, ipads, and other hand-held portable electronics devices.

BACKGROUND OF THE INVENTION

Spring-driven clamps are known for mounting device holders to hold small cameras onto flat screen computer displays for the purpose of web conferencing, the clamp being coupled at the camera's base by a standard ¼ inch-20 threaded connection and operated to grip a suitable external mounting surface of the flat screen computer display. However, such known clamps are limited in their ability to provide a universal mounting solution because the external mounting surface for the clamp is limited to a projection surface, such as the flat screen computer display, that is narrow enough to receive the arms of the around it and rigid enough to stand up under the load. Also, the structure of the clamp for receiving the camera device is the standard ¼ inch-20 female thread common to virtually all cameras.

SUMMARY OF THE INVENTION

The known spring-driven rotational clamps of the prior art is directed to mounting device holders on external surfaces having a narrow projecting surface, such as flat screen computer monitors and the like having a narrow projecting surface small enough to receive the arms of the around it, which severely limits the usefulness of the clamp. Furthermore, the structure for receiving the camera is limited to the standard ¼ inch-20 threaded connection common to cameras, which further limits the clamp's usefulness.

Applicant's invention thus rests on his realization and discovery that, while the spring-driven clamps have usefulness limited to supporting the camera, the spring-driven clamp disclosed herein is useful for actually gripping a portable phone, ipad, small camera, or other normally hand-held portable electronic device because the small size of such devices makes them ideal for receiving the arms of the clamp's grip fully around it. Furthermore, when utilized as a clamp for the hand-held portable electronic device to be clamped, the spring-driven clamp disclosed herein can be supported by any of a variety of support structures so that their usefulness is not limited to flat screen computer monitors and the like having a narrow projecting surface small enough to receive the arms of the clamp around it, as in the prior art.

Accordingly, based upon applicant's realization, his invention provides for a quick and easy clamping structure that does not require the external mounting surface to be narrow and rigid, as in the prior art. None of this is disclosed, suggested by, or obvious from applicant's prior art or prior art familiar to the applicant.

The present invention is a method of mounting a hand-held portable telephone or other normally hand-held portable device, wherein the method includes: mounting a body of a portable device holder on a mounting surface external of the portable device holder with a base surface thereof facing substantially away from the mounting surface; rotating opposing arms apart around a central post interior of the body, whereby substantially upright opposing fingers adjacent to ends of the arms are rotated apart; inserting a portable device between the rotated apart opposing fingers; and resiliently urging together the rotated apart opposing arms, whereby opposing fingers are urged into compressive contact with the portable device.

According to one aspect of the invention rotating opposing arms apart around a central post interior of the body is further characterized by rotating opposing arms apart into a rotated apart state, and the method is further characterized by restraining the opposing arms in the rotated apart during the inserting of the portable device between the rotated apart opposing fingers.

According to another aspect of the invention inserting a portable device between the rotated apart opposing fingers is further characterized by urging the portable device into a position substantially laminarly juxtaposed to the base surface of the body.

According to another aspect of the invention resiliently urging together the rotated apart opposing arms, whereby opposing fingers are urged into contact with the portable device, is further characterized by closing a portion of the fingers over a portion of the portable device.

According to still another aspect of the invention resiliently urging together the rotated apart opposing arms, whereby opposing fingers are urged into contact with the portable device is further characterized by compressing a portion of one or more of the fingers against the portable device.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 and FIG. 3 each illustrate portable device mounting apparatus of the invention having rotationally movable arm pairs for receiving the normally hand-held device, wherein FIG. 2 illustrates the mounting apparatus deployed in an initial relaxed or unexpanded state, and FIG. 3 illustrates the mounting apparatus deployed in a compressive state;

FIG. 5 and FIG. 6 show an interior of the mounting apparatus, wherein the cover is removed for clarity, wherein FIG. 5 shows the mounting apparatus without its torsional biasing element, and FIG. 6 shows the torsional biasing element;

FIG. 7 illustrates insertion of a portable device into the mounting apparatus;

FIG. 8 illustrates clamping of the portable device in the mounting apparatus; and FIG. 9 and FIG. 10 each illustrate operation of the mounting apparatus from underneath, wherein the body cover is removed for clarity.

DETAILED DESCRIPTION OF PREFERRED EMBODIMENT

Although the following discussion is directed toward use of the present invention in conjunction with hand-held portable telephones, those skilled in the art will recognize that the present invention may be utilized to securely mount a wide variety of similar articles at a convenient location. Thus, discussion of the present invention in conjunction with a hand-held portable telephone is by way of example only and not by way of limitation.

As required, a detailed illustrative embodiment of the present method of clamping a normally hand-held device is disclosed herein. However, techniques, systems and operating structures in accordance with the present method of clamping a normally hand-held device may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present method of clamping a normally hand-held device. The following presents a detailed description of an illustrative embodiment (as well as some alternative embodiments) of the present method of clamping a normally hand-held device.

In the Figures, like numerals indicate like elements.

Figure 1:
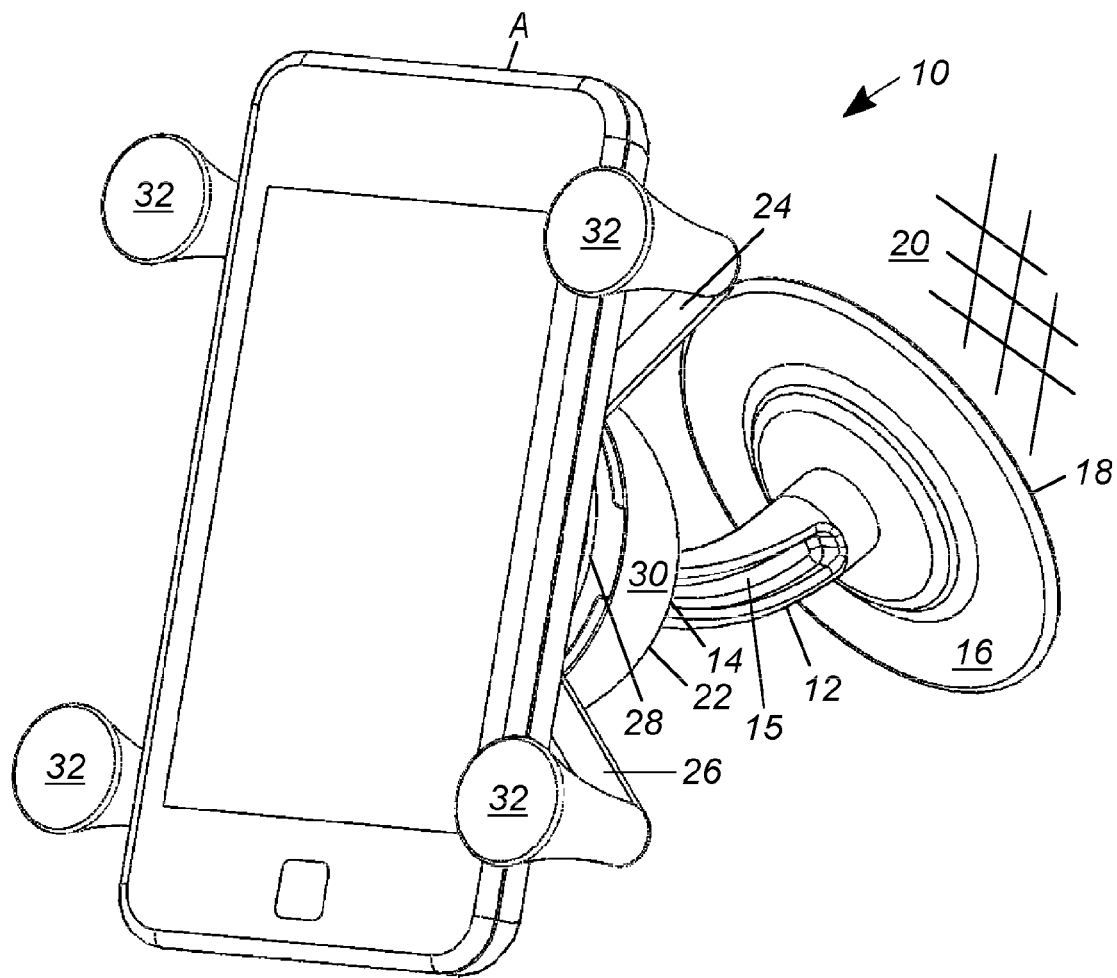
FIG. 1 illustrates an X-grip portable device mounting apparatus of the invention being coupled to as external mounting surface 20 by a support stand 12.

The method of the present invention of clamping a normally hand-held device is illustrated in FIGS. 1-10 of the drawings which depict a presently best mode embodiment of the method of the invention. Referring now to FIG. 1, an X-grip hand-held portable telephone mounting apparatus 10 is mounted on a support stand 12, such as but not limited to a mounting apparatus having one or more interconnectable articulated elements 14 of the type disclosed, for example, in U.S. patent application Ser. No. 12/589,744 filed in the name of the inventor of the instant invention on Oct. 28, 2009, the complete disclosure of which is incorporated herein by reference, and having a rigid arm 15 extended from a mounting base portion formed of a pliantly conformable mounting pad 16 with a coupling agent such as a conventional pressure sensitive adhesive, or PSA, on its under surface 18 for coupling to a mounting surface 20 external of mounting apparatus 10. Accordingly, mounting apparatus 10 is mounted on external mounting surface 20 by coupling support stand 12 therebetween. X-grip hand-held portable device mounting apparatus 10 is structured for releasably clamping a hand-held portable telephone or other normally hand-held device A. For example, mounting apparatus 10 includes a substantially hollow part-spherical or cup-shaped body 22 having at least two pair of rotationally movable substantially rigid opposing arms 24 and 26 extending substantially radially outwardly therefrom adjacent to a substantially planar interface surface 28a of a base portion 28 of body 22 cutting across its substantially hollow part-spherical or cup-shaped cover portion 30. Arm pairs 24, 26 are rotationally biased toward one another on substantially opposite sides of body 22 of mounting apparatus 10. Each arm 24, 26 includes a corresponding substantially upright clamping finger 32 distal from mounting apparatus body 22 and projected upwardly above interface surface 28a of base portion 28 of body 22. Clamping fingers 32 optionally include rubber or another resiliently compressible elastomeric material suitable for protecting the normally hand-held device A from scratching while providing a high friction surface suitable for resisting any tendency for the device A to slide from between clamping fingers 32.

A hand-held portable telephone or other normally hand-held device A is captured between clamping fingers 32 of pairs of arms 24, 26 for convenient storage and access thereto. X-grip mounting apparatus 10 is supported by support stand 12 which attaches mounting apparatus 10 to a desired mounting surface 20 of a vehicle, such as but not limited to an automobile, boat or airplane.

The universally adjustable mounting device is optionally a universally positionable mounting device such as that manufactured by National Products, Inc., of Seattle, Wash., and detailed in U.S. Pat. No. 5,845,885, the complete disclosure of which is hereby incorporated by reference, however other similar devices are contemplated herein. As will be recognized, such devices provide a means whereby the X-grip mounting apparatus 10 can be rapidly mounted to a wide variety of surfaces and once attached, the mounting apparatus 10 can be oriented as desired. Alternatively, no such mounting device may be utilized and the hand-held portable device mounting apparatus 10 of the present invention is mounted directly to a desired surface, i.e. an automobile dashboard or console.

FIG. 2 and FIG. 3 each illustrate part-spherical or cup-shaped portion 30 of body 22 of mounting apparatus 10 being supported on support stand 12 with rotationally movable arm pairs 24, 26 extended substantially radially outwardly therefrom adjacent to substantially planar interface surface 28a of base portion 28 of body 22 opposite from support stand 12. Accordingly, mounting apparatus 10 is available for receiving the normally hand-held device A in a position substantially seated against interface surface 28a of base portion 28 between corresponding clamping fingers 32 of arm pairs 24, 26. Rotationally movable arm pairs 24, 26 are extended substantially radially from body 22 through circumferential slotted apertures 34 adjacent to its interface surface 28a for seating hand-held device A there against. Slotted apertures 34 extend part of circumference of body 22 and permit arm pairs 24, 26 to rotate about an axis 36 of body 22 that is substantially perpendicular to interface surface 28a of base portion 28. FIG. 2 illustrates mounting apparatus 10 deployed in an initial relaxed or unexpanded state with arm pairs 24, 26 being resiliently urged together (arrows 38) in rotation each toward the other, with upright clamping fingers 32 being brought together at opposite sides of base interface surface 28a of body 22, for example top and bottom of body 22 as illustrated here.

FIG. 3 illustrates mounting apparatus 10 deployed in a compressive state with arm pairs 24, 26 being forcibly rotated apart (arrows 40) against resilient urging force each away from the other, with upright clamping fingers 32 being spread apart at opposite sides of base interface surface 28a of body 22, for example left and right of body 22 as illustrated here.

Figure 4:
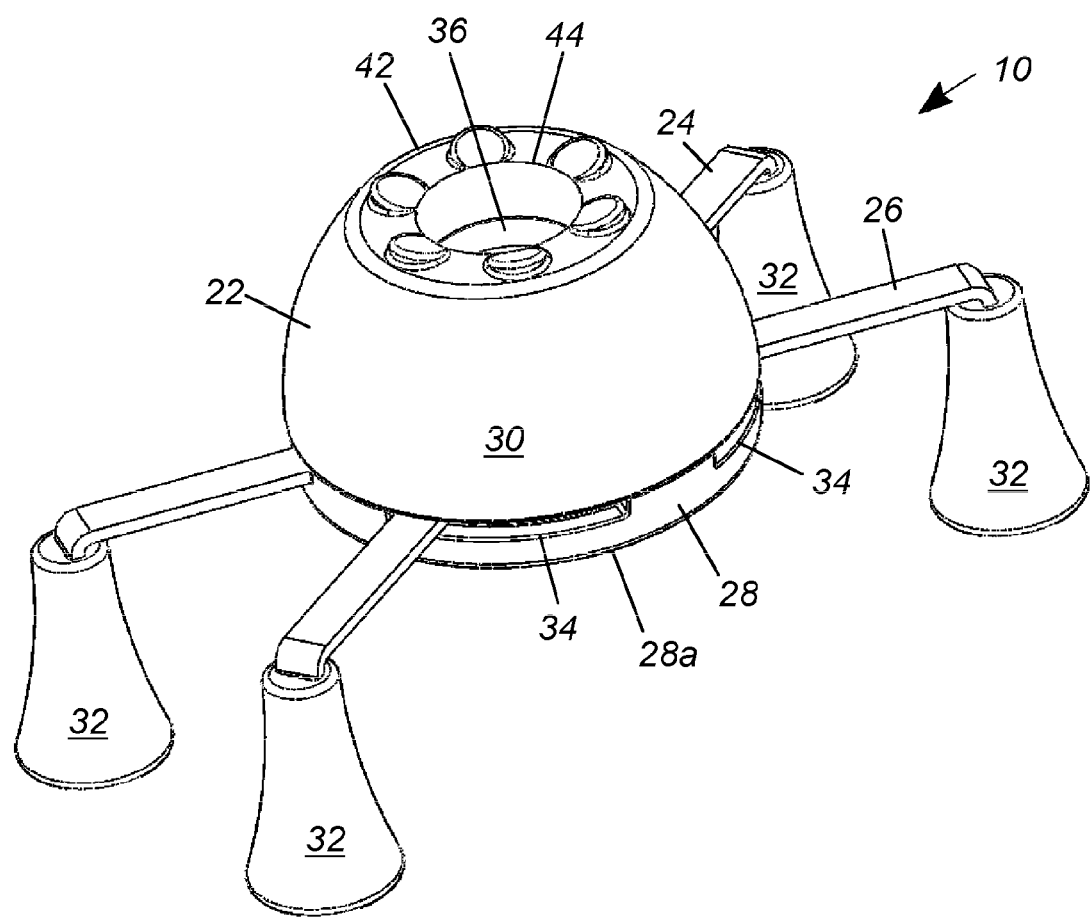
FIG. 4 illustrates a part-spherical cover portion of a body of the mounting apparatus.

FIG. 4 illustrates part-spherical or cup-shaped cover portion 30 of body 22 of mounting apparatus 10, wherein a crown portion 42 of cover 30 is adapted for mounting on support stand 12. For example, body 22 of mounting apparatus 10 is mounted on mounting surface 20 external of mounting apparatus 10 with interface surface 28a thereof facing substantially oppositely or away from external mounting surface 20. According to one exemplary embodiment, crown portion 42 of cover 30 is formed with a connector base 44. Here, connector base 44 is illustrated by example and without limitation in the form of a pocket adapted to interconnect with a ball portion on the end of rigid arm 15 of support stand 12 to form therewith an articulated ball-and-socket joint when support stand 12 is of the type disclosed, for example, in U.S. patent application Ser. No. 12/589,744, which is incorporated herein, however other similar devices are contemplated herein.

Figure 5:
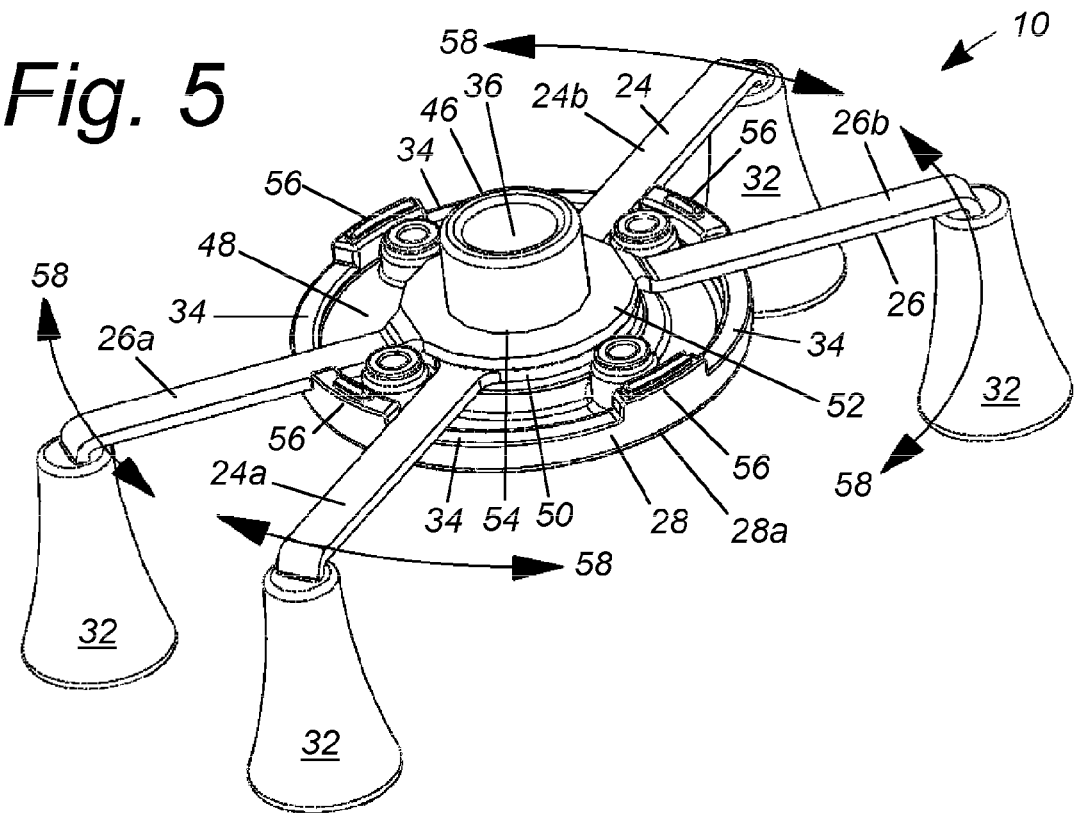
Figure 6:
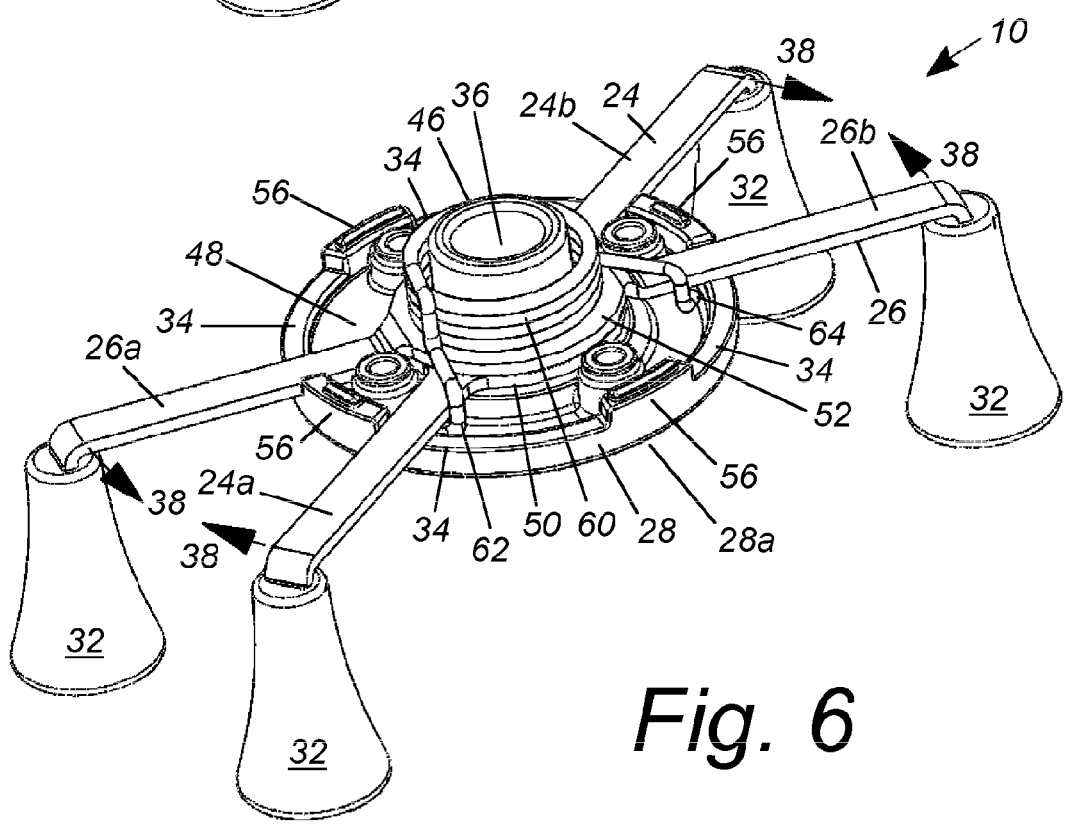

FIG. 5 and FIG. 6 show an interior of mounting apparatus 10, wherein cover 30 is removed for clarity. Within the interior of mounting apparatus 10 a central axle or pivot 46 formed, for example, as a substantially cylindrical central column or post, is projected from an interior surface 48 of base portion 28 opposite from interface surface 28a and aligned substantially along axis 36 of body 22. Arm pairs 24, 26 are illustrated as each being substantially identical structures each formed as single rigid arms having respective central rotation portions 50, 52 intermediate between respective first and second arm portions 24a, 24b and 26a, 26b which are extended outwardly therefrom. For example, first and second arm portions 24a, 24b and 26a, 26b are extended radially outwardly from respective central rotation portions 50, 52 of arms 24, 26. Optionally, first and second arm portions 24a, 24b and 26a, 26b are further structured to be substantially coplanar, as shown. Central rotation portions 50, 52 of arms 24, 26 are each formed with round central apertures 54 sized to fit on cylindrical central pivot 46 on interior surface 48 of base 28 and rotate freely thereabout. Arm portions 24a, 24b and 26a, 26b are extended through circumferential slotted apertures 34 adjacent to interface surface 28a of base portion 28 which operates as a seating surface of the mounting apparatus 10 for hand-held device A. Slotted apertures 34 are sized to permit rotation of arms 24, 26 within a wide range limited only by peripheral spurs 56 that minimally interrupt circumferential slotted apertures 34 at each quadrant Peripheral spurs 56 mate with cup-shaped cover portion 30 of body 22 to stabilize base 28. Arms 24, 26 thus rotate freely about pivot 46 with portions 24a, 24b and 26a, 26b rotating in substantially concentric arcs (arrows 58) about base surface 28 between the initial relaxed or unexpanded state (shown here) and the expanded compressive state (FIG. 3).

FIG. 6 shows a biasing member 60, such as a coiled torsion spring, loosely fit over pivot 46 and stretched for hooking each of first and second end portions 62, 64 to one of arms 24, 26 in a position within peripheral boundary of base 28. Tension in coiled torsion spring 60 operates for biasing together the two pair of arms 24, 26, with respective first and second arm portions 24a, 24b and 26a, 26b being biased (arrows 38) each toward the other within limitations of circumferential slotted apertures 34, whereby opposing clamping fingers 32 are biased together the into a compressive clamping relationship with the portable device A, with arm portions 24a, 24b and 26a, 26b being rotated substantially around axis 36 of body 22.

In contrast, spreading apart the two pair of arms 24, 26 is accomplished by rotating arm portions 24a, 24b and 26a, 26b on opposite sides of interface surface 28a of a base portion 28 around axis 36 of body 22 against the torsional urging force of biasing member 60, whereby biasing member 60 is resiliently compressed between arm pairs 24, 26.

FIG. 7 illustrates insertion of portable device A into mounting apparatus 10. Body 22 of mounting apparatus 10 is mounted on mounting surface 20 external of mounting apparatus 10 with interface surface 28a of base portion 28 thereof facing substantially away from external mounting surface 20. See, e.g., FIG. 1. Here, respective opposing arm portions 24a, 24b and 26a, 26b of arm pairs 24, 26 are rotated apart (arrows 40) around central pivot or post 46 interior of body 22 into a rotated apart state, whereby substantially upright opposing fingers 32 adjacent to ends of arm portions 24a, 24b and 26a, 26b are rotated apart against the resilient torsional urging force of biasing member 60. With arm pairs 24, 26 and opposing fingers 32 being thus rotated apart (arrows 40) and restrained in the rotated apart state, portable device A is inserted (arrow 66) between rotated apart opposing fingers 32 into a seated position, for example, having in a position substantially laminarly juxtaposed to upwardly facing interface surface 28a of base portion 28 of body 22.

FIG. 8 illustrates clamping of portable device A in mounting apparatus 10. With portable device A seated substantially against interface surface 28a of base portion 28, arms 24, 26 are released, whereupon torsional urging force of biasing member 60 operates for resiliently urging together (arrows 38) the rotated apart opposing arms 24, 26, whereby opposing fingers 32 are urged into compressive contact with side portions A1 and A2 of portable device A. Any hand-held portable telephone or other portable device A or similar article may thus be captured between opposing fingers 32 under the tension of torsional biasing spring 60.

The design of fingers 32 is optionally altered to space portable device A away from interface surface 28a of base portion 28 of body 22. For example, a groove or V-notch is formed in a side wall 32a of one or more of fingers 32, whereby portable device A is captured between fingers 32 in a position spaced away from interface surface 28a of base portion 28.

As shown here, side walls 32a of fingers 32 are increasingly enlarged distal from arm portions 24a, 24b and 26a, 26b. Accordingly, as illustrated, at least an upper portion 32b of fingers 32 closes over a portion of sides A1, A2 of portable device A. Side walls 32a of fingers 32 are optionally formed of a resilient elastomeric material that compresses against side portions A1, A2 of portable device A under compressive force of biasing member 60.

FIG. 9 shows operation of mounting apparatus 10 from underneath, wherein body 22 is shown with cover 30 removed for clarity. Here, similarly to FIG. 7, respective opposing arm portions 24a, 24b and 26a, 26b of arm pairs 24, 26 are rotated apart (arrows 40) around central pivot or post 46 against the resilient torsional urging force (arrows 68) of biasing member 60 into the rotated apart state, whereby substantially upright opposing fingers 32 are simultaneously rotated apart.

In FIG. 10, with arm pairs 24, 26 and opposing fingers 32 being thus rotated apart and restrained in the rotated apart state, portable device A is inserted between rotated apart opposing fingers 32 into a seated position, for example, having in a position substantially laminarly juxtaposed to upwardly facing interface surface 28a of base portion 28 of body 22. With portable device A seated substantially against interface surface 28a of base portion 28, arms 24, 26 are released, whereupon torsional urging forces (arrows 68) of biasing member 60 operate for resiliently urging together (arrows 38) the rotated apart opposing arms 24, 26, whereby opposing fingers 32 are urged into compressive contact with side portions A1 and A2 of portable device A.

Portable device A is removed from mounting apparatus 10 in a process similar to the reverse of the insertion process. Portable device A is removed by grasping device A and rotating arms 24, 26 against urging forces (arrows 68) of biasing member 60 away from device sides A1, A2 to release device A. Device A is thereafter released to be lifted between fingers 32 and away from interface surface 28a of base portion 28 of body 22.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention.

Accordingly, the inventor makes the following claims.

What is claimed is:

1. A method of mounting a portable device, the method comprising:
   on an external mounting surface, mounting a portable device holder comprising an interface surface and a pair of substantially rigid arms each rotatable on a common pivot and spreadable about the interface surface;

spreading apart the arms of the portable device holder by rotation of at least one of the arms about the interface surface, wherein spreading apart the arms by rotation further comprises resiliently compressing a biasing member;

inserting a portable device between substantially upright opposing clamping fingers that are projected from the arms; and biasing the opposing clamping fingers into a compressive clamping relationship with the portable device.

2. The method of claim 1, wherein spreading apart the arms by rotation further comprises resiliently compressing the biasing member between the pair of arms.

3. The method of claim 1, wherein mounting the portable device holder on an external mounting surface further comprises coupling a support stand between the external mounting surface and the portable device holder.

4. The method of claim 1, wherein biasing the opposing clamping fingers into a compressive clamping relationship with the portable device further comprises biasing together the pair of substantially rigid arms in a rotational manner about the interface surface of the portable device holder.

5. The method of claim 1, wherein inserting a portable device between opposing clamping fingers of the arms further comprises positioning the portable device substantially against the interface surface of the portable device holder prior to the biasing the opposing clamping fingers into a compressive clamping relationship with the portable device.

6. The method of claim 5, wherein spreading apart the arms by rotation about the interface surface of the portable device holder further comprises rotating the pair of arms about an axis oriented substantially perpendicular to the interface surface of the portable device holder.

7. A method of mounting a portable device, the method comprising:

mounting a body of a portable device holder on a support stand with an interface surface of the body facing substantially outwardly therefrom and a plurality of substantially rigid arms each received on a common pivot and extended substantially radially outwardly therefrom adjacent to the interface surface;

coupling the support stand to a mounting surface external of the portable device holder;

rotating the opposing arms apart and resiliently compressing a biasing element;

fitting a portable device between opposing clamping fingers projected substantially upright adjacent to ends of the arms distal from the body;

rotating the opposing arms together by operation of the resilient urging force; and releasably clamping the portable device between the opposing clamping fingers adjacent to the ends of the arms.

8. The method of claim 7, wherein resiliently compressing a biasing element between the opposing arms further comprises resiliently compressing the biasing element between opposing portions of the arms.

9. The method of claim 8, wherein rotating opposing arms apart against a resilient urging force further comprises rotating opposing arms apart against a resilient torsional urging force.

10. The method of claim 8, wherein mounting a body of a portable device holder on a support stand further comprises coupling the support stand to a portion of the body of the portable device holder substantially opposite from the interface surface of the body.

11. The method of claim 8, wherein releasably clamping the portable device between the opposing clamping fingers adjacent to the ends of the arms further comprises resiliently biasing the opposing clamping fingers into a compressive clamping relationship with the portable device.

12. The method of claim 8, wherein fitting a portable device between opposing clamping fingers further comprises positioning the portable device against the interface surface of the body of the portable device holder prior to the rotating the opposing arms together by operation of the resilient urging force and releasably clamping the portable device between the opposing clamping fingers.

13. The method of claim 12, wherein rotating opposing arms apart against a resilient urging force further comprises rotating the rotating the arms about an axis oriented substantially perpendicular to the interface surface of the body of the portable device holder.

14. A method of mounting a portable device, the method comprising:

mounting a body of a portable device holder on a mounting surface external of the portable device holder with an interface surface thereof facing substantially away from the mounting surface;

rotating opposing arms apart around a common post positioned centrally of an interior of the body, whereby substantially upright opposing fingers adjacent to ends of the arms are rotated apart and a biasing element is compressed;

inserting a portable device between the rotated apart opposing fingers; and resiliently urging together the rotated apart opposing arms, whereby opposing fingers are urged into compressive contact with the portable device.

15. The method of claim 14, wherein rotating opposing arms apart around a central post interior of the body further comprises rotating opposing arms apart into a rotated apart state; and further comprising restraining the opposing arms in the rotated apart during the inserting of the portable device between the rotated apart opposing fingers.

16. The method of claim 15, wherein inserting a portable device between the rotated apart opposing fingers further comprises urging the portable device into a position substantially laminarly juxtaposed to the interface surface of the body.

17. The method of claim 16, wherein resiliently urging together the rotated apart opposing arms, whereby opposing fingers are urged into contact with the portable device further comprises closing a portion of one or more of the fingers over a portion of the portable device.

18. The method of claim 16, wherein resiliently urging together the rotated apart opposing arms, whereby opposing fingers are urged into contact with the portable device further comprises compressing a portion of one or more of the fingers against the portable device.

* * * * *